United States Patent [19]

McDowall

[11] Patent Number: 4,473,345

[45] Date of Patent: Sep. 25, 1984

[54] SYSTEM FOR DETECTING SOLID OBSTACLES BETWEEN CONFRONTING SURFACES OF PRESSURE PLATES

[75] Inventor: William McDowall, Girvan, Scotland

[73] Assignee: Hull Corporation, Hatboro, Pa.

[21] Appl. No.: 406,723

[22] Filed: Aug. 11, 1982

[51] Int. Cl.³ ............................................. B29C 17/00
[52] U.S. Cl. .................................... 425/137; 264/40.5; 425/154; 425/169
[58] Field of Search ............... 425/136, 137, 138, 154, 425/169; 264/40.5

[56] References Cited

U.S. PATENT DOCUMENTS 3,942,928 3/1976 Kelz .................................... 425/137

OTHER PUBLICATIONS

Perry, John H., *Chemical Engineers' Handbook*, 4th Ed., 1963, pp. 22-76–22-78; 25-24–25-25; 22-85.

*Primary Examiner*—Donald E. Czaja
*Assistant Examiner*—M. A. Becker
*Attorney, Agent, or Firm*—Oliver D. Olson

[57] ABSTRACT

An inlet gas pressure passageway is associated with the movable mold section of a molding press and terminates at and therefore in the plane of the surface of said movable mold section which confronts the surface of the fixed mold section of the press. An outlet gas pressure passageway is associated with the fixed mold section and terminates at and therefore in the plane of the surface of said fixed mold section in alignment with the inlet passageway opening. Air or other gas under a predetermined superatmospheric is applied to the inlet passageway for delivery to the outlet passageway, and the latter is connected to a pressure switch operable at said predetermined gas pressure to effect application of high hydraulic closing pressure to the movable mold section. However, if an obstacle or other impurity is present between the confronting mold surfaces, the resulting space between said surfaces allows gas pressure to leak into it, and the resulting drop in gas pressure at the pressure switch prevents the application of high closing pressure to the movable mold section.

5 Claims, 3 Drawing Figures

4,473,345

SYSTEM FOR DETECTING SOLID OBSTACLES BETWEEN CONFRONTING SURFACES OF PRESSURE PLATES

BACKGROUND OF THE INVENTION

This invention relates to plastic molding presses and other types of pressure plates, and more particularly to novel means by which to ensure against application of high closure pressure to the mold sections of a press when a solid impurity is on one of the confronting mold surfaces.

Molds employed in the high pressure molding of synthetic resins, elastomers and other materials are very expensive, and therefore every effort generally is made to ensure against, or at least minimize damage to them.

For example, it is a frequent occurrence that tiny bits of flash or other impurities adhere to one or both of the confronting surfaces of the mold sections, or tiny insert strips or wires become misaligned and thereby overlie a mold face. It has been found that under the high closing pressure utilized with such molds, such obstacles or other impurities literally hob and therefore damage the hardened tool surfaces of the molds.

In view of the foregoing, it has been the practice heretofore to provide for initial closing of the mold sections under very low pressure and to utilize sensitive limit switches to detect whether the mold surfaces are fully closed or are spaced apart due to some intervening obstacle or other impurity, the limit switches under the latter condition functioning to prevent the application of high final closure pressure and thus prevent damage to the mold.

However, it is generally recognized that limit switches as heretofore employed are not sufficiently accurate as a sensing element and they are incapable of being set with sufficient accuracy to detect the presence of impurities of minute size which nevertheless are capable of damaging the mold.

SUMMARY OF THE INVENTION

In its basic concept, this invention involves the passage of a gas under a predetermined superatmospheric pressure from an inlet opening in the plane of the confronting surface of one of a pair of pressure plates to an aligned outlet opening in the plane of the confronting surface of the other of the pair of pressure plates, and the detection of the air pressure in the outlet opening, a drop in air pressure indicating that a solid obstacle or other impurity between the confronting surfaces has prevented closure of the pressure plates.

It is a virtue of the foregoing basic concept that the principal objective of this invention is achieved; namely, the avoidance of the aforementioned limitations and disadvantages attending the prior use of limit switches to control the closure of a pair of pressure plates.

Another objective of this invention is the provision of a method and system for detecting solid impurities between the confronting surfaces of pressure plates which ensures substantially 100% contact of the confronting surfaces of such pressure plates before high closing pressure may be applied.

Still another object of this invention is the provision of a method and system of the class described which affords precise control of the closing of the confronting surfaces of diverse forms of machine parts in a variety of industrial applications.

A further objective of this invention is the provision of a system of the class described which is a simplified construction for economical manufacture, is adaptable to a wide variety of end uses, requires a minimum of maintenance and repair and is capable of reproducible precision over a long operating life.

The foregoing and other objects and advantages of this invention will appear from the following detailed description, taken in connection with the accompanying drawing of a preferred embodiment.

DESCRIPTION OF THE PREFERRED EMBODIMENT

Figure 1:
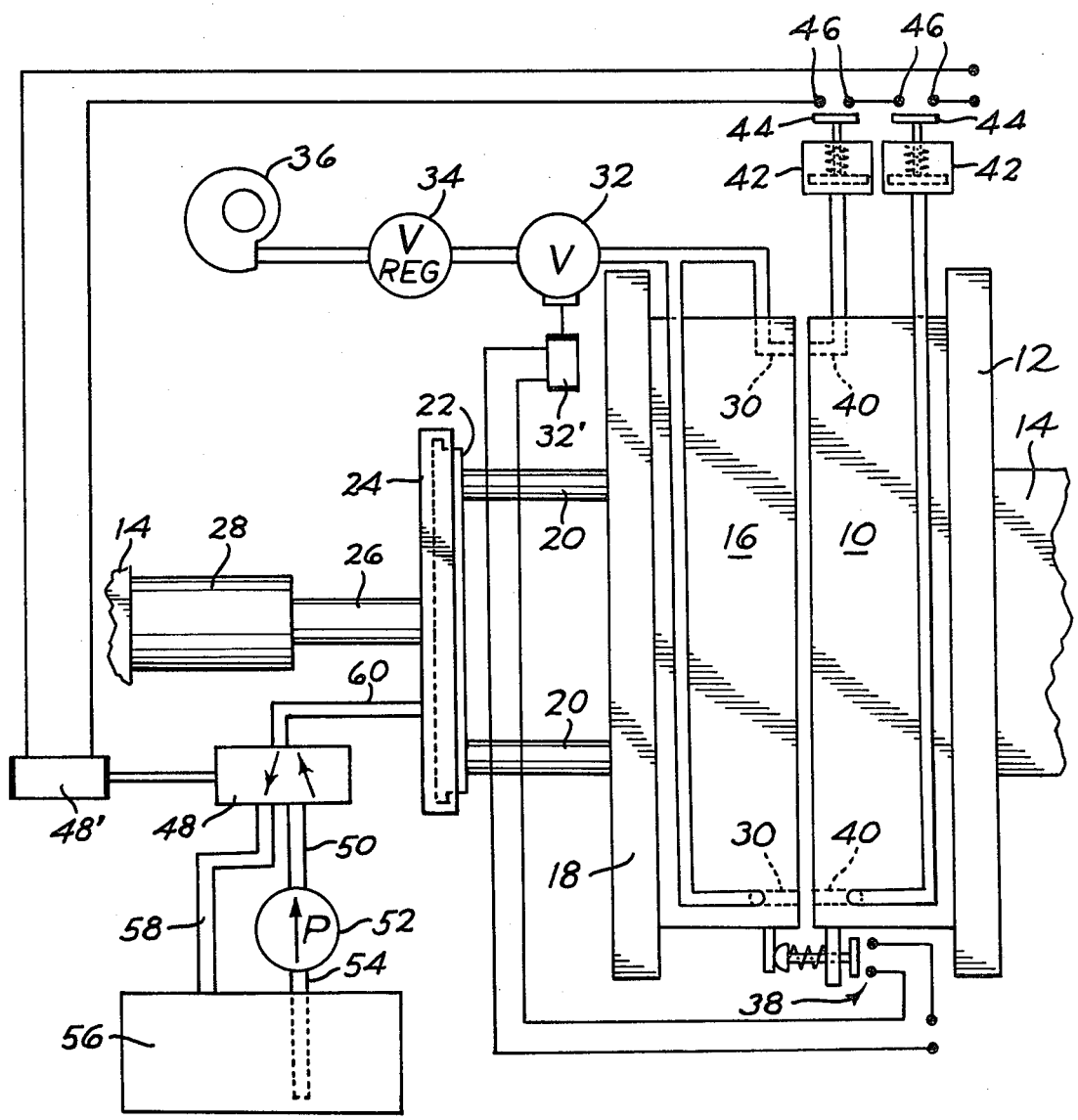
FIG. 1 is a schematic diagram of a plastic molding press incorporating a surface impurity sensing system embodying the features of this invention.

Although this invention has utility in detecting solid obstacles or other impurities between the confronting surfaces of a wide variety of types of pressure plates, the drawing illustrates such a pair of pressure plates in the form of a pair of mold sections associated with a plastic molding press. In the schematic illustration, one mold section 10 is stationery, being mounted on a platent 12 fixed to a stationery frame component 14 of the press. The companion mold section 16 is mounted on a platen 18 which is movable relative to the fixed section, whereby the confronting surfaces of the mold sections are movable one toward and away from the other.

In the embodiment illustrated, the movable platen 18 of the press is connected to a plurality of piston rods 20 which extend from the piston 22 of a high pressure clamp cylinder 24 which functions to provide high closing pressure for the molds. The clamp cylinder is connected to the piston rod 26 of a low pressure cylinder 28 which also is secured to a fixed frame component 14 of the press. The low pressure cylinder functions to effect full opening of the molds, for ejecting of mold pieces from the mold, for installing inserts of various types in the mold for subsequent embedding in plastic, and for various other functions such as maintenance and repair of the mold components.

The low pressure cylinder 28 also functions to effect movement of the mold section 16 to closed position. Then, if the detection system to be described indicates that the confronting surfaces of the mold sections are free of impurities, the high pressure cylinder 24 operates to apply high closing pressure to the mold sections preliminary to the injection of plastic or other material into the mold.

In accordance with this invention, air or other suitable gas under low superatmospheric pressure is utilized to detect whether the confronting surfaces of the mold sections are fully closed or whether they are separated by virtue of the presence of some form of solid impurity between them.

Figures 2, 3:
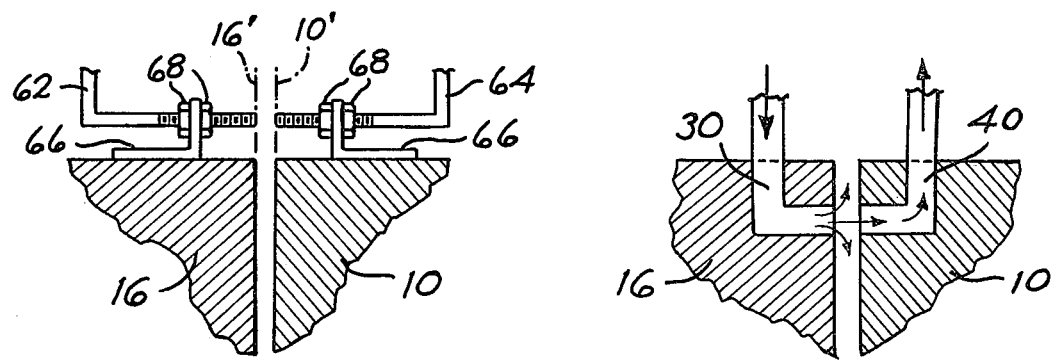
FIG. 2 is a fragmentary sectional view of the press molds of FIG. 1 showing an arrangement of passages therein providing aligned openings in the confronting surfaces of the mold sections, the arrows indicating the directions of passage of air under pressure resulting from the mold sections being spaced apart.
FIG. 3 is a fragmentary sectional view similar to FIG. 2 showing an alternative arrangement for the air passageways.

In the embodiment illustrated in FIGS. 1 and 2, the movable mold section 16 is provided with at least one, and preferably two or more spaced apart inlet passageways 30 each terminating at the confronting surface of the movable mold section. In FIG. 1 there is shown two such inlet passageways, one adjacent the top end of the mold section and the other adjacent the bottom end of the mold section. These passageways may be centered between the lateral sides of the mold section, or at opposite corners, or at any other desirable location. An inlet passageway may be provided at each of the four corners of the movable mold sections, if so desired.

Each of the inlet passageways is connected through a solenoid operated valve 32 to the output of a pressure regulator valve 34 the input of which is connected to the output of an air pump 36 or other source of gas under superatmospheric pressure. Although the regulator valve may be chosen or adjusted to regulate the gas pressure to any desired magnitude, it has been found that an air pressure regulated to not more than about 7 psi is quite satisfactory.

Also associated with the mold sections is a low pressure limit switch 38 which is adjusted to close the associated contacts when the confronting surface of the movable mold section 16 is spaced from but in close proximity to the confronting surface of the fixed mold section 10. Upon such closure of the limit switch, an electric circuit is completed for the solenoid 32' of the valve 32 in the outlet line from the pressure regulator valve 34. The valve thus is moved to the position in which the outlet of the regulator valve communicates with the inlet passageways 30 in the movable section 16 of the mold. Air or other gas under regulated low pressure thus is delivered through the inlet passageways.

A gas outlet passageway 40 is provided in the fixed mold section 10 for association with each of the inlet passageways 30 provided in the movable mold section 16. Each outlet passageway terminates at the confronting surface of the fixed mold section in alignment with the confronting end of the associated inlet passageway. Accordingly, when the confronting surfaces of the mold sections are fully closed against each other, the associated inlet and outlet passageways form a single, continuous, uninterrupted passageway. Thus, the gas under pressure delivered through the inlet passageway to the outlet passageway remains constant.

On the other hand, and with particular reference to FIG. 2 of the drawing, if an obstacle or other impurity is present on one or both of the confronting surfaces of the mold sections, preventing complete closure of the confronting surfaces, gas pressure from the inlet passageway is allowed to escape to the resulting space between the confronting surfaces. Accordingly, the gas pressure in the outlet passageway 40 is diminished.

Each outlet passageway in the fixed mold section is coupled to the inlet of a pressure switch 42 illustrated diagrammatically in FIG. 1. The switch functions under the influence of a predetermined but adjustable gas pressure to extend and retract an electrical contact 44 into and out of engagement with a pair of spaced electrical contacts 46.

The electrical contacts of each pressure switch are connected in series in an electric circuit of the solenoid 48' of a solenoid valve 48. An inlet port of the valve is connected through a conduit 50 to the output of an hydraulic pump 52. The input of the pump communicates through a conduit 54 with the sump reservoir 56. The valve also includes an exhaust port which communicates through conduit 58 with the reservoir. The valve also includes an outlet port which is coupled through high pressure flexible hydraulic line 60 with a high pressure cylinder.

In the position of the valve illustrated in FIG. 1, the outlet port and exhaust port of the valve are in communication, whereby hydraulic fluid pressure in the high pressure clamp cylinder 24 is exhausted to the reservoir. Upon activation of the solenoid 48' the valve 48 is shifted to the left to the alternate position in which the inlet port communicates with the outlet port to provide high pressure hydraulic fluid from the pump 52 to the high pressure clamp cylinder 24. This effects clamping of the movable mold section 16 against the fixed mold section 10 under high pressure.

It is to be noted from FIG. 1 that the plurality of pressure switches 42 are connected in series in the electric circuit of the valve solenoid 48'. Accordingly, it is required that all areas of the confronting surfaces of the mold sections be closed against each other in order to effect closing all of the pressure switches, before the solenoid valve 48 can be activated to apply high pressure to the clamp cylinder 24.

In the event an obstacle or other impurity is present between the confronting surfaces of the mold sections, preventing complete closure of said confronting surfaces, gas pressure is allowed to leak into the space between the confronting surfaces (FIG. 2). This prevents delivery of that predetermined gas pressure to the associated pressure switch 42. Since the pressure switch is adjusted to close the electrical contacts 46 only upon application to the switch of substantially the same gas pressure exiting the regulator valve 34, it will be apparent that the drop in gas pressure resulting from the leakage of gas into the space between the confronting surfaces of the mold sections will provide the pressure switch with insufficient gas pressure to close the electrical contacts.

However, in the event the confronting surfaces of the mold sections are free of impurities, the low pressure cylinder 28 operates to move the confronting surfaces into mutual contact. Accordingly, the associated inlet and outlet passageways are joined to form a continuous, uninterrupted, single passageway which serves to deliver to the pressure switch 42 substantially the same gas pressure as set by the pressure regulator 34. As a result, the electrical contacts associated with each pressure switch are closed, completing the electric circuit of the solenoid 48' of the control valve 48 and moving the latter to the alternate position from FIG. 1. Accordingly, hydraulic fluid under high pressure is delivered to the high pressure cylinder 24. The mold sections thus are clamped together under high pressure, enabling the injection of synthetic plastic or other appropriate molding material to the molds.

In the event it is preferred to provide operator control of closing the press mold, the pressure switches 42 may be replaced with conventional gas pressure gauges. Thus, unless the operator finds the gauge reading to be substantially the same as the pre-set regulated pressure, the high pressure clamp cylinder would not be actuated to clamp the mold sections.

In the embodiment illustrated in FIGS. 1 and 2, the inlet and outlet passageways 30 and 40, respectively, are shown to be formed directly in the mold sections 10 and 16, respectively. In FIG. 3 the inlet and outlet passageways are shown to be provided by inlet and outlet tubes 62 and 64, respectively, mounted outwardly of the side surfaces of the mold sections by means of brackets 66 secured to said mold sections. The outwardly projecting portion of each bracket is aperatured to receive the associated tube therethrough, and the latter is threaded externally for the reception of a pair of adjustment nuts 68 located on opposite sides of the bracket. By appropriate rotation of the adjustment nuts, the terminal end of the inlet tube 62 may be adjusted to terminate at the plane 16' of the confronting surface of the movable mold section 16. In similar manner, the aligned terminal end of the outlet tube 64 may be adjusted to the plane 10' of the confronting surface of the fixed mold section 10. In this manner the aligned confronting openings have the same relationship as the confronting openings of the inlet and outlet passageways formed in the mold sections in FIGS. 1 and 2.

As previously mentioned, the present invention has particular utility in association with the mold sections of molding presses. However, the invention also has utility in a wide range of industrial applications in which it is necessary to sense the very close positioning of two pairs of confronting surfaces before a next step in an operation is allowed to happen. Such industrial applications are to be found in the machine tool industry, the metal stamping industry and many others.

It will be apparent to those skilled in the art that various changes may be made in the size, shape, type, number and arrangement of parts and in the method steps described hereinbefore, without departing from the spirit of this invention and the scope of the appended claims.

Having now described my invention and the manner in which it may be used, I claim:

1. In combination with a pair of pressure members having confronting surfaces movable one into contact with the other first under low closing pressure and second under high clamping pressure, means for detecting solid impurities between the confronting surfaces of said pressure members, comprising:
    (a) gas pressure inlet passageway means associated with one of the pressure members and terminating in a plane representing the plane of the confronting surface of said one pressure member,
    (b) gas pressure outlet passageway means associated with the other of the pressure members and terminating in a plane representing the plane of the confronting surface of said other pressure member,
    (c) a source of gas under a predetermined pressure communicating with the inlet passageway means,
    (d) a valve member between the source of gas and the inlet passageway means operable upon movement under low closing pressure of the confronting surfaces one to a predetermined space distance toward and in close proximity to the other to communicate the source of gas under pressure with the inlet passageway means,
    (e) valve control means mounted on the pressure members for movement therewith toward and away from said predetermined spaced distance for controlling said operation of the valve member, and
    (f) means connected to the outlet passageway means for detecting the presence of gas delivered thereto from the inlet passageway means, a drop in gas pressure indicating that said confronting surfaces are spaced apart.

2. The combination of claim 1 wherein the valve member is a solenoid operated valve, the solenoid of which is in an electric circuit, and the valve control means comprises an electric switch in said electric circuit mounted on the pressure members arranged to be operated by movement of said confronting surfaces one to said predetermined spaced distance toward and in close proximity to the other to activate the solenoid to move the valve to communicate the source of gas under pressure with the inlet passageway means.

3. The combination of claim 2 wherein one of the pressure members is movable relative to the other under high clamping pressure by a source of high hydraulic pressure controlled by an electric solenoid valve having an electric circuit, and the gas pressure detecting means includes an electric switch in said electric circuit operable by said predetermined gas pressure in the outlet passageway means to close said electric circuit and apply high hydraulic clamping pressure to move said one pressure member toward the other.

4. The combination of claim 3 wherein the electric circuit for the solenoid valve controlling the high hydraulic pressure includes a plurality of electric switches arranged in series and each switch is associated with a separate pair of inlet and outlet passageway means located at spaced apart positions on the pair of pressure members.

5. In combination with a pair of pressure members having confronting surfaces movable one toward and away from the other, means for detecting solid impurities between the confronting surfaces of said pressure members, comprising:
    (a) a gas pressure inlet tube mounted on and spaced outwardly of the outer side of one of the pressure members and terminating in a plane representing the plane of the confronting surface of said one pressure member,
    (b) a gas pressure outlet tube mounted on and spaced outwardly of the outer side of the other pressure member and terminating in a plane representing the plane of the confronting surface of said other pressure member, the ends of the gas pressure inlet tube and outlet tube being in axial alignment,
    (c) means connected to the inlet tube for supplying thereto a gas under a predetermined superatmospheric pressure, and
    (d) means connected to the outlet tube for detecting the presence of gas delivered thereto from the inlet passageway means, a drop in gas pressure indicating that said confronting surfaces are spaced apart.

* * * * *